United States Patent [19]
Gunn et al.

[11] Patent Number: 5,893,040
[45] Date of Patent: *Apr. 6, 1999

[54] METHOD AND APPARATUS FOR AUTOMATICALLY PROVIDING JET ENGINE THRUST RATINGS TO AVIONIC SYSTEMS

[75] Inventors: Peter D. Gunn, Bellevue; Richard Allen Herald, Lynnwood; Ian C. Martindale, Seattle; Clement Val Paulson, Renton, all of Wash.

[73] Assignee: The Boeing Company, Seattle, Wash.

[*] Notice: This patent issued on a continued prosecution application filed under 37 CFR 1.53(d), and is subject to the twenty year patent term provisions of 35 U.S.C. 154(a)(2).

[21] Appl. No.: 648,554

[22] Filed: May 15, 1996

[51] Int. Cl.⁶ .............................. G06F 19/00; G05D 1/10
[52] U.S. Cl. ......................... 701/15; 73/117.4; 244/76 R
[58] Field of Search .................................. 701/3, 4, 7, 8, 701/10, 9, 14, 15, 99, 16; 244/234, 76 R, 178, 182, 194, 195; 73/117.3, 117.4, 116

[56] References Cited

U.S. PATENT DOCUMENTS

| | | | |
|---|---|---|---|
| 4,268,908 | 5/1981 | Logue et al. | 395/800.38 |
| 4,430,584 | 2/1984 | Someshwar et al. | 326/37 |
| 4,431,988 | 2/1984 | Molusis et al. | 345/168 |
| 4,642,775 | 2/1987 | Cline et al. | 701/200 |
| 4,729,102 | 3/1988 | Miller, Jr. et al. | 701/14 |
| 4,843,554 | 6/1989 | Middleton et al. | 701/15 |
| 5,001,638 | 3/1991 | Zimmerman et al. | 244/76 R |
| 5,006,993 | 4/1991 | Virnig et al. | 701/99 |
| 5,029,778 | 7/1991 | DeLuca | 244/234 |
| 5,033,010 | 7/1991 | Lawrence et al. | 364/550 |
| 5,050,081 | 9/1991 | Abbott et al. | 701/14 |
| 5,070,458 | 12/1991 | Gilmore et al. | 701/14 |
| 5,270,931 | 12/1993 | Appleford | 701/3 |
| 5,318,449 | 6/1994 | Schoell et al. | 434/305 |

FOREIGN PATENT DOCUMENTS 2 181 103 A  3/1987  United Kingdom .

*Primary Examiner*—Tan Q. Nguyen
*Attorney, Agent, or Firm*—Christensen O'Connor Johnson & Kindness PLLC

[57] ABSTRACT

An avionic system (102) in which engine thrust rating data is transmitted from electronic engine controllers (108a and 108b) to flight management computer/thrust management computers (120a and 120b) via digital data buses (110a, 110c, and 114) is disclosed. The flight management computer/thrust management computers (120a and 120b) select the proper data set for the specified engine thrust rating upon power-up. If the thrust rating changes, the flight management computer/thrust management computers (120a and 120b) select a new data set corresponding to the new thrust rating as received over the digital data bus (110a, 110c, and 114). This is accomplished without the need to change aircraft wiring. The flight management computer/thrust management computers (120a and 120b) store the thrust rating in nonvolatile memory (126), allowing the flight management computer/thrust management computers (120a and 120b) to use the stored value to initialize relevant settings according to current engine thrust rating.

23 Claims, 4 Drawing Sheets

METHOD AND APPARATUS FOR AUTOMATICALLY PROVIDING JET ENGINE THRUST RATINGS TO AVIONIC SYSTEMS

FIELD OF THE INVENTION

The present invention relates to aircraft avionics and, more particularly, to methods and apparatus for providing aircraft engine thrust ratings to avionic systems.

BACKGROUND OF THE INVENTION

Modern jet aircraft include one or more flight management computers electronically connected to electronic engine controllers that are used to control the engines of the aircraft. The maximum level of thrust that can be provided by modern jet engines varies. Airline companies set limits in the level of thrust an engine is to produce under normal operating conditions. This level of thrust is referred to as the "thrust rating" of the engine. Setting a thrust rating below the maximum available level of thrust decreases fuel consumption, and increases engine life. The thrust rating of an engine is determined by expected operating conditions. Heavier aircraft loads require a higher thrust rating. Takeoffs at higher altitudes generally require a higher thrust rating than takeoffs at or near sea level. The flight management/ thrust management computers of aircraft use the thrust rating to develop proper engine control signals.

Currently, in order to change an aircraft engine thrust rating, it is necessary to change program pin wiring connected to the flight management/thrust management computers. Upon power-up, the flight management/thrust management computers are initialized with the thrust rating as determined by the program pins. The ratings are used by the flight management/thrust management computers for the duration of the flight.

Reconfiguration of the program pin wiring is time consuming and costly. It also creates configuration verification difficulties. The present invention is directed to overcoming these disadvantages.

SUMMARY OF THE INVENTION

In accordance with this invention, a method and apparatus for providing engine thrust ratings to aircraft avionic systems is provided. Information pertaining to engine thrust ratings is transmitted from electronic engine controllers of the aircraft to one or more avionic computers of the aircraft via one or more digital data buses. Specifically, an identifier is transmitted, where each identifier corresponds to an engine thrust rating. The engine controllers determine the engine thrust rating identifier by reading the configuration of a set of plugs in the associated engine. This identifier is digitally transmitted to the flight management computer/ thrust management computer (FMC/TMC). The FMC/TMC includes a database having entries that correspond to various thrust ratings. The FMC/TMC selects the proper data set for the received specified engine thrust rating upon power-up. More specifically, upon power-up, the FMC/TMC(s) read engine thrust rating identifiers, store them in memory, and use the stored rating identifiers at power-up to establish a performance database. When a particular thrust rating is to be changed, the configuration of the set of plugs in the engine whose rating is to be changed is modified to represent the new thrust rating identifier. As a result, the next time power-up occurs, the thrust rating identifier is updated to reflect the new rating.

In accordance with other aspects of this invention, the FMC/TMC includes volatile memory and nonvolatile memory. The identifier pertaining to the thrust rating of the engine is stored in the nonvolatile memory.

In accordance with still other aspects of this invention, the FMC/TMC periodically receives a thrust rating identifier from the electronic engine controllers, compares the received thrust rating identifier with the stored thrust rating identifier, and updates the stored thrust rating identifier if the received identifier differs from the stored identifier.

In accordance with yet other aspects of this invention, the jet aircraft includes two or more jet engines, each having a thrust rating. The FMC/TMC receives the thrust rating identifier from the electronic controller of each jet engine, compares the thrust ratings of the engines, and reports a fault condition if the thrust ratings of the engines do not match. Preferably, the fault condition is reported by the FMC/TMC only if the jet aircraft is on the ground at the time of the comparison.

In accordance with other further aspects of this invention, the avionic system of the aircraft includes at least two FMC/TMCs connected to a common digital data bus. Both FMC/TMCs receive the same thrust rating identifier, and store the thrust rating identifier in their respective memories.

In accordance with yet still other aspects of this invention, the memory of the FMC/TMC(s) includes a database containing multiple entries, each entry corresponding to an engine thrust rating. The FMC/TMC(s) perform a test to determine if an engine thrust rating database entry corresponding to the received thrust rating identifier exists. The thrust rating identifier is stored in the nonvolatile memory of the FMC/TMC(s) only if a corresponding database entry exists.

As will be readily appreciated from the foregoing description, an avionic system formed in accordance with the invention allows the selected engine thrust rating identifier sent to an FMC/TMC to be changed without having to modify existing wiring. When the thrust rating of a jet engine is changed, the new rating is automatically read and used to update the rating identifier stored in the FMC/TMC. More specifically, the electronic engine controller associated with each engine automatically reads engine thrust rating data defined by the engine plug configuration and sends the identifier to the FMC/TMC. The FMC/TMC determines whether the received thrust rating identifier is valid and, if so, stores the thrust rating identifier in memory, preferably nonvolatile memory. The FMC/TMC periodically processes newly received data pertaining to engine thrust rating, determines the validity of the identifier relative to stored data, and stores the new thrust rating identifier in memory if the identifier is found to be valid and different. If the preferable procedure of storing the thrust rating identifier in nonvolatile memory is employed, the thrust rating identifier will be available after a power-off, power-on cycle. In essence, the invention simplifies the changing of thrust rating data.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
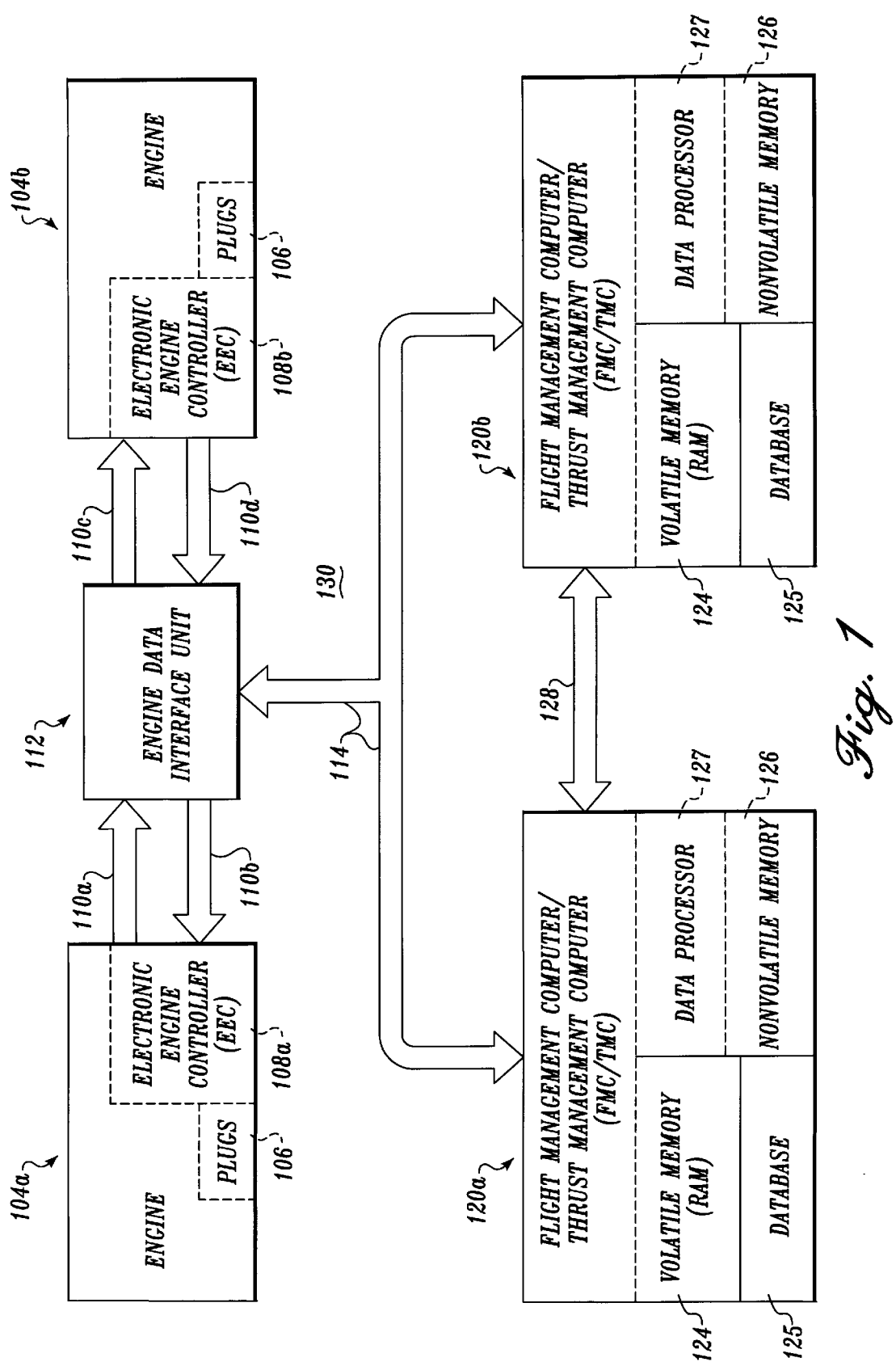
FIG. 1 is a block diagram of an avionic system incorporating the present invention.

FIG. 1 is a block diagram illustrating the major components of an avionic system 102 incorporating the present invention. It is assumed for purposes of discussion that the jet aircraft with which the present invention is being utilized is a two-engine commercial jet aircraft, such as the model 777 produced by The Boeing Company, Seattle, Wash. If the invention is used with an aircraft that includes one jet engine or more than two jet engines, changes that will be apparent to those skilled in this art, in view of the following, will have to be made. Furthermore, in an aircraft comprising a plurality of jet engines, the present invention may be utilized with any subset of engines included on the aircraft.

The avionic system illustrated in FIG. 1 comprises: a pair of jet engines 104a and 104b, each having an electronic engine controller (EEC) 108a and 108b coupled to the engine; a first avionic computer, specifically a flight management computer/thrust management computer (FMC/TMC) 120a and a second FMC/TMC 120b ; and a communication system 130 for transferring digital data between the electronic engine controllers 108 and the FMC/TMCs 120a and 120b. As illustrated in FIG. 1, a flight management computer and a thrust management computer are physically located together and are hereinafter identified as an FMC/TMC 120. In an alternate configuration, the flight management computer and thrust management computer may be separated from each other. The flight management computer and thrust management computer each employ the same process with regard to the invention as described below.

Each jet engine 104a and 104b includes a set of plugs 106 whose configuration establishes the thrust rating of the jet engine 104. Since plugs 106 and how they are manually configured are well known in this art, such plugs and how they are configured are not described here. As is also well known in this art and, thus, not described here, the EECs 108a and 108b are capable of sensing the configuration of the plugs 106, interpreting the configuration, and producing digital data denoting the thrust rating of the engines 104a and 104b.

The communication system 130 for transferring digital data between the EECs 108a and 108b and the flight management computers 120a and 120b illustrated in FIG. 1 comprises a plurality of digital data buses and an engine data interface unit 112. With reference to the left engine 104a, a first controller data bus 110a carries data from the left engine EEC 108a to the engine data interface unit 112. While the controller digital data bus 110a can be any type of digital data bus, in one actual embodiment of the present invention, the controller digital data bus 110a is an ARINC 429 digital data bus. Since the ARINC 429 digital data bus is capable of carrying digital data in only one direction, such as from the left engine EEC 108a to the engine data interface unit 112, this embodiment requires a second controller digital data bus 110b to carry data in the reverse direction, i.e., from the engine data controller 112 to the left engine EEC 108a. A corresponding pair of controller digital data buses 110c and 110d carry digital data between the right engine EEC 108b and the engine data interface unit 112. In an alternate configuration, single bidirectional digital data buses could be used in place of the pairs of controller digital data buses 110a, 110b, and 110c, 110d.

As illustrated in FIG. 1, a flight management digital data bus 114 electronically connects the engine data interface unit 112 with both of the FMC/TMCs 120a and 120b. In one actual embodiment of the invention, an ARINC 629 digital data bus forms the flight management digital data bus 114. Since the ARINC 629 digital data bus is bidirectional, it is capable of carrying data between the engine data interface unit 112 and the FMC/TMCs 120a and 120b in both directions. This is preferable to an alternate configuration, such as forming the flight management digital data bus 114 from two or more unidirectional digital data buses.

A primary function of the engine data interface unit 112 is to serve as an interface between the controller digital data buses 110a, 110b, 110c, and 110d and the flight management digital data bus 114. Since different types of digital data buses employ different protocols for transferring data, the engine data interface unit 112 translates protocols as well as data between the controller and flight management digital data buses.

As will be readily appreciated by those skilled in this art and others, the communication system 130 illustrated in FIG. 1 for transferring digital data between the electronic engine controllers 108a and 108b and the FMC/TMCs 120a and 120b should be considered as exemplary, not limiting. In an alternative configuration, for example, one or more digital data buses could directly couple the EECs 108a and 108b to the FMC/TMCs 120a and 120b. Such a configuration may consist of a single bidirectional digital data bus, or two unidirectional digital data buses. In such a configuration, the engine data interface unit 112 is not necessary. Instead, the EECs 108a and 108b send data directly to and receive data directly from the FMC/TMCs 120a and 120b. As can be readily appreciated by those skilled in this art and others, on most airplanes, the flight management digital data bus 114 is comprised of a plurality of digital data buses.

The avionic system illustrated in FIG. 1 further includes a second flight management digital data bus 128 for carrying digital data between the left and right FMC/TMCs 120a and 120b. The second flight management digital data bus 128 allows the FMC/TMCs 120a and 120b to compare processing results. Obviously, a single FMC/TMC 120 could be used, if desired.

The FMC/TMCs 120a and 120b, illustrated in FIG. 1, each include a volatile memory 124 and a nonvolatile memory 126. Nonvolatile memory is capable of retaining data in the absence of power; therefore, information stored therein is retained through a computer power-down and power-up cycle. Volatile memory does not retain data stored therein when a computer is powered down. Each FMC/TMC 120a and 120b also includes a database 125, which may be stored in the nonvolatile memory 126, or in a separate (not shown) nonvolatile memory. Each FMC/TMC 120a and 120b also includes a data processor 127. For simplicity of illustration, and since they are not pertinent for the present invention, other well known elements of FMC/TMCs are not illustrated in FIG. 1.

As will be better understood from the following description, the EECs 108a and 108b continuously sense the configuration of the plugs 106 of the engines 104a and 104b, interpret the configurations to determine the current thrust ratings of the engines 104a and 104b, and send a corresponding thrust rating identifier to the engine data interface unit 112 via the controller digital data buses 110a and 110c. The engine data interface unit 112 transforms the data into a form suitable for application to the flight management digital data bus 114, which transfers the data to the FMC/TMCs 120a and 120b on a frequent periodic basis. In one actual embodiment of the invention, a new thrust rating identifier is sent to the FMC/TMCs 120a and 120b about five times per second. As will be readily appreciated by those skilled in this art and others, the thrust rating identifier may be formed in a variety of ways to represent an engine thrust rating.

Figure 2:
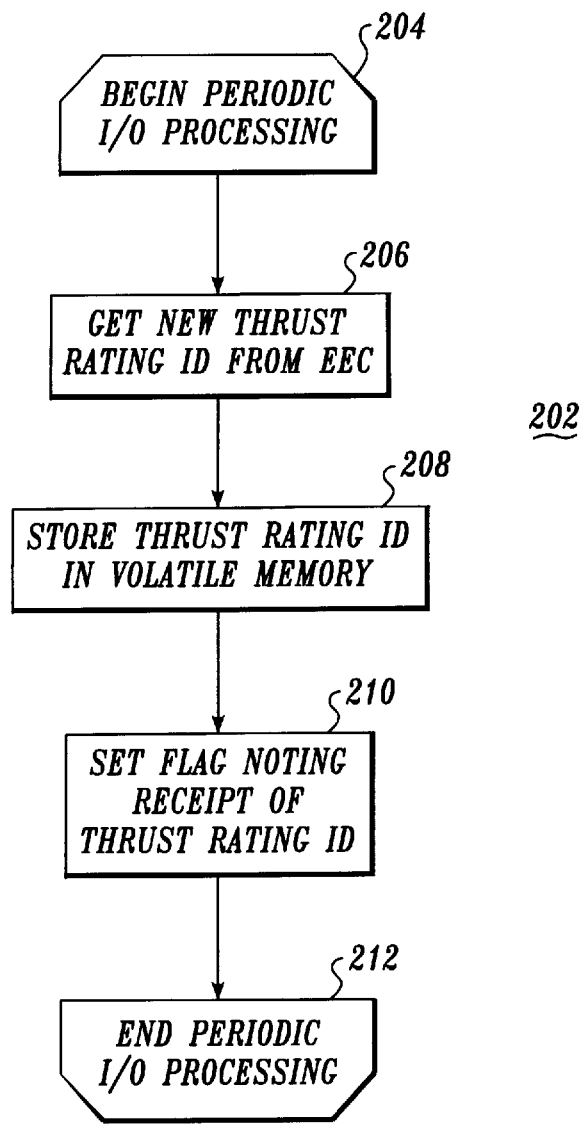
FIG. 2 is a flow diagram illustrating the periodic process used by the flight management computers shown in FIG. 1 to handle newly received thrust rating data.

The process used by the FMC/TMCs to handle newly received thrust rating identifiers from the EECs 108a and 108b is illustrated in FIG. 2. Periodic I/O processing 202 is illustrated as beginning at step 204. Step 204 may be triggered by a clock, for example. Next, at step 206, the associated FMC/TMCs 120a or 120b receive a new thrust rating identifier from the related EEC 108a or 108b. At step 208, the FMC/TMCs 120a and 120b store the newly received thrust rating identifier in volatile memory 124. At step 210, a flag is set to mark the receipt of the thrust rating identifier. At step 212, the periodic I/O processing loop ends, and the process recycles to the beginning (step 204). The effect of the periodic I/O processing 202 is that the FMC/TMCs 120a and 120b receive a new thrust rating almost immediately after the configuration of the plugs is changed in the jet engines 104a and 104b. Periodic I/O processing 202 begins when the FMC/TMCs 120a and 120b are turned on, and continues as long as the FMC/TMCs remain powered up.

Figure 3:
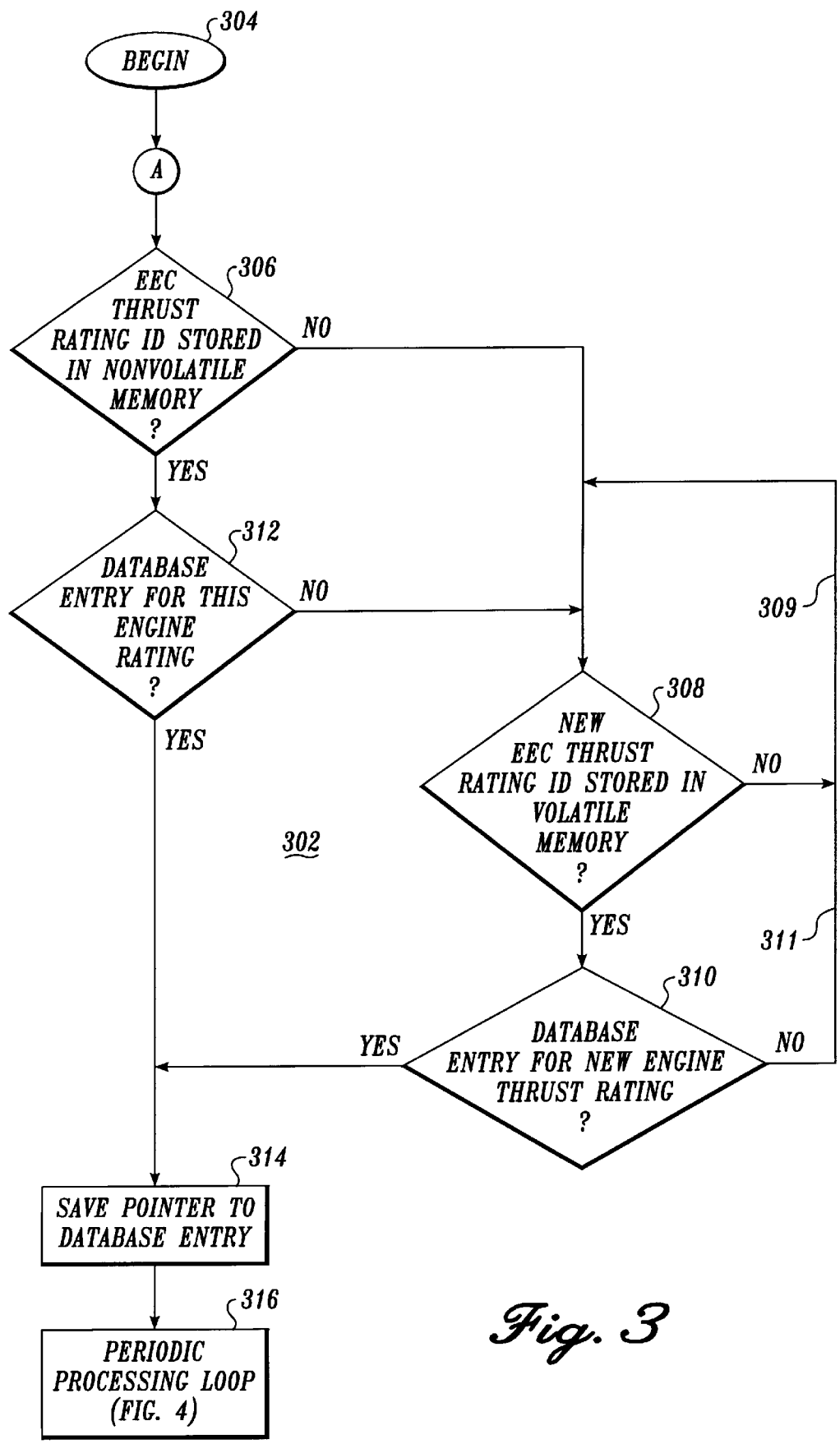
FIG. 3 is a flow diagram illustrating the process used by the flight management computers shown in FIG. 1 to determine whether a database entry corresponding to a jet engine thrust rating exists in the memory of the flight management computers/thrust management computers.

FIG. 3 is a flow diagram illustrating a portion of the process 302 used by the FMC/TMCs 120a and 120b (FIG. 1) to determine if the database 125 of the related FMC/TMC includes an entry corresponding to a received thrust rating identifier. The processing 302 illustrated in FIG. 3 begins 304 on power-up. At step 306 a test is made to determine whether an EEC thrust rating identifier is stored in nonvolatile memory 126 (FIG. 1). Because information stored in nonvolatile memory 126 is retained even after power down of the FMC/TMC 120, a negative determination occurs only if a thrust rating has never been stored in the nonvolatile memory 126. If such a negative determination is found, the process branches to step 308, where a test is made to determine whether an engine thrust rating identifier, as reported by one of the EECs 108a and 108b (FIG. 1), has been stored in volatile memory as a result of the periodic I/O processing 202 shown in FIG. 2 and described above. If an engine thrust rating identifier is not stored in volatile memory, the process loops back along path 309 and repeats the determination step 308. The periodic I/O processing 202 (FIG. 2) occurs independently of the processing illustrated in FIG. 3. The continuous looping shown by path 309 is terminated when a new thrust rating identifier is received from one of the EECs (step 206 in FIG. 2), the thrust rating is stored in volatile memory (step 208), and the proper flag is set (step 210).

When the determination step 308 determines that an EEC thrust rating identifier is available in volatile memory, the process proceeds to step 310, where a test is made to determine whether a database entry corresponding to the newly received engine thrust rating identifier exists. More specifically, as briefly described above, the FMC/TMCs 120a and 120b each include a database 125. The databases include information pertaining to the jet engines 104a and 104b and the jet aircraft. Among the information included in the databases 125 is a plurality of entries, each entry corresponding to one or more thrust ratings. These entries are used by the FMC/TMCs 120a and 120b in a variety of ways that are well known to those skilled in this art. Since the uses of the thrust rating database entries are not pertinent to this invention, the use of such entries is not described here.

Step 310 of FIG. 3 is a determination of whether a particular database entry corresponding to the newly reported thrust rating identifier exists in the database 125. If such an entry does not exist, the process loops back to step 308, and the test of whether a new thrust rating identifier has been reported by one of the EECs 108a or 108b is repeated. If so, the test at step 310 is repeated. In this manner, the continuous loop 311 is terminated only when a new and different thrust rating identifier is reported by one of the EECs 108a and 108b and a corresponding database entry exists (step 310). When a corresponding database entry has been found, at step 314 the FMC/TMC 120 saves a pointer value to the database entry corresponding to the new engine thrust rating identifier. The pointer value can be used to quickly access the information in the database 125 corresponding to the reported thrust rating identifier when access is required by the related FMC/TMC 120a or 120b. After a pointer value has been saved, the process cycles to a periodic processing loop 316, illustrated in FIG. 4 and described in detail below.

Returning to step 306, if on power-up a determination is made that a thrust rating identifier is stored in nonvolatile memory 126 (FIG. 1), the process proceeds to step 312, where a test is made to determine whether a database entry exists for the engine thrust rating identifier stored in non-volatile memory 126. The determination of step 312 is similar to that of step 310, discussed above, except that, in step 310, the engine thrust rating tested comes from the thrust rating identifier stored in volatile memory 124 (FIG. 1), as performed in step 208 of FIG. 2. The test of step 312 tests the thrust rating identifier stored in nonvolatile memory 126, in accordance with FIG. 4 and described below. If the test performed at step 312 is negative, the process cycles to step 308 and enters the decision path of steps 308 and 310 as described above. In contrast, if, at step 312, a corresponding database entry is found for the thrust rating identifier stored in nonvolatile memory 126, the process cycles to step 314 where the pointer to the database entry is saved.

Figure 4:
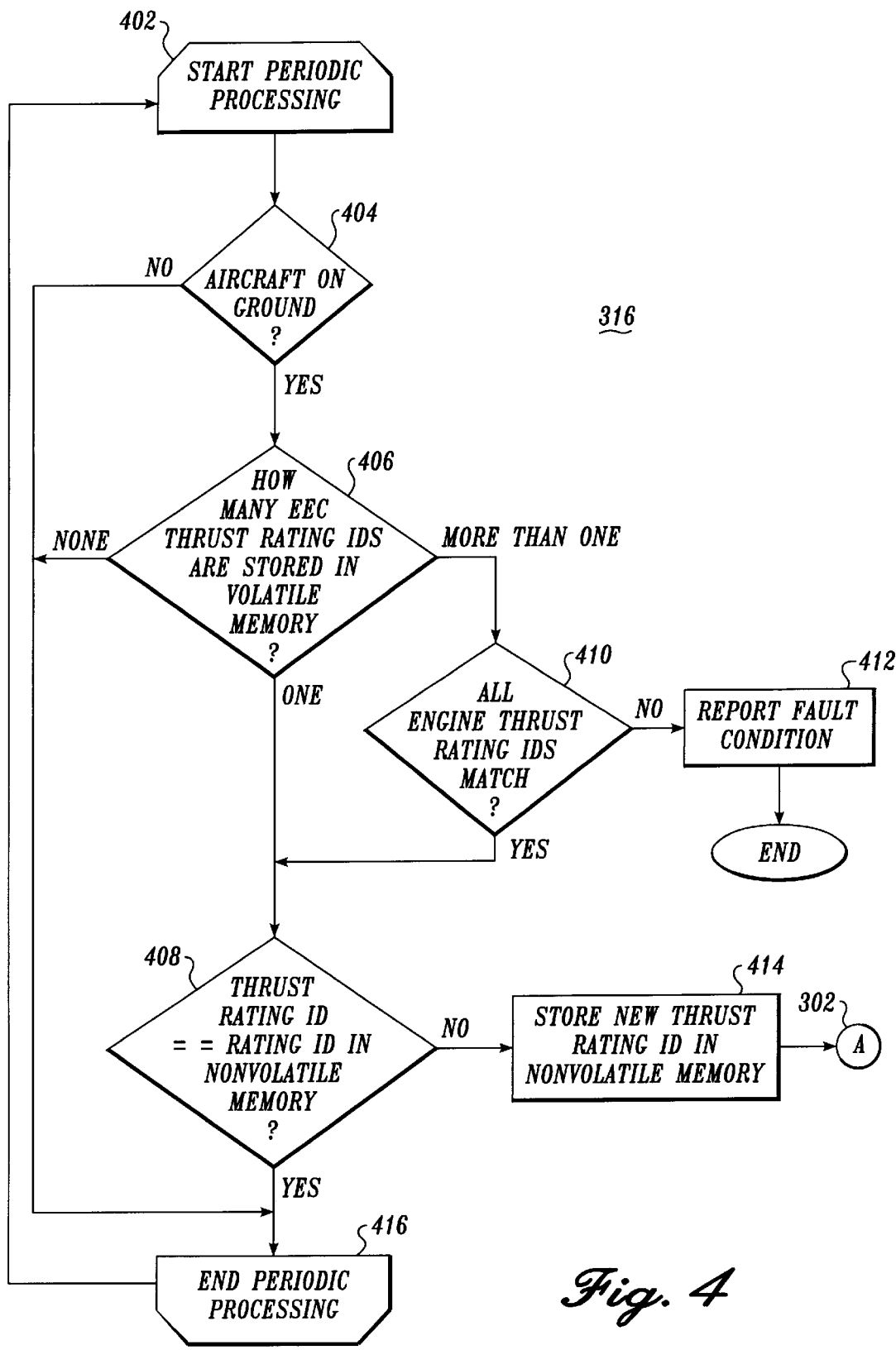
FIG. 4 is a flow diagram illustrating the process used by the flight management computers shown in FIG. 1 for updating the jet engine thrust rating identifier stored in memory and determining whether the jet engine thrust rating identifiers are valid.

As can be readily understood from the above description, when the periodic processing loop 316 is entered, either an old thrust rating identifier is stored in nonvolatile memory 126 (FIG. 1) or a newly reported thrust rating identifier is stored in volatile memory 124, and a valid corresponding database entry in the database 125 exists. FIG. 4 illustrates the periodic processing loop 316. The periodic processing loop 316 begins at step 402. At step 404, the FMC/TMCs 120a and 120b make a test to determine whether the aircraft is on the ground. In order to ensure that changes to the EEC thrust rating due to failures during flight do not affect aircraft operation, changes in a thrust rating identifier stored in nonvolatile memory are only allowed to take place if the aircraft is on the ground. Thus, a negative determination at step 404 results in a branch to a point in the process immediately prior to the end of periodic processing 416. If the aircraft is on the ground, the processing cycles to step 406.

At step 406 a determination is made of the number of EEC-reported thrust rating identifier stored in volatile memory. If no new EEC thrust rating identifiers are stored in volatile memory, the process branches to the end of the periodic processing 416. If only one thrust rating identifier is stored in volatile memory, the process proceeds to step 408, where a test is made to determine whether the thrust rating identifier stored in volatile memory is the same as the thrust rating identifier stored in nonvolatile memory 126 (FIG. 1). If the determination is negative, at step 414 the FMC/TMC 120 replaces the "old" thrust rating identifier stored in nonvolatile memory 126 with the "new" thrust rating identifier. Following this, the processing proceeds back to the beginning of FIG. 3, and the processing described above reoccurs. Thus, the program proceeds as it does upon power-up of the FMC/TMCs 120a and 120b (FIG. 1). If, at step 408, the thrust rating identifier stored in volatile memory 124 is the same as the thrust rating identifier stored in nonvolatile memory 126, the process cycles to the end of periodic processing 416. This is the most common path, resulting from no change in the plugs that define the thrust rating of the engines 104a and 104b.

If, at step 406, more than one thrust rating identifier is stored in volatile memory, the process branches to step 410, where a test is made to determine whether all of the engine thrust rating identifiers stored in volatile memory match. If they do not match, at step 412 a fault condition is reported, the periodic processing loop 316 terminates, and the program ceases. Operator intervention is required at this point.

If, at step 410, it is determined that the reported thrust rating identifiers from all engines match, the process proceeds to step 408, as it does in the situation where only one thrust rating identifier is reported (step 406). It should be noted that the test at step 410 simplifies thrust rating selection on aircraft having engines whose thrust ratings are all the same. The invention does not require this test to be performed. On an aircraft where differing thrust ratings are allowed among the engines, steps 410 and 412 would be eliminated, and processing would cycle to step 408 whenever one or more EEC-reported ratings are available. In this alternative, the FMC/TMCs 120a and 120b would store a thrust rating identifier in nonvolatile memory 126 for each jet engine 104.

While the presently preferred embodiment of the invention has been illustrated and described, it will be appreciated that various changes can be made therein without departing from the spirit and scope of the invention as defined in the appended claims. For example, the sequence of many of the processing steps depicted in FIGS. 3 and 4 could be changed or the steps carried out in other ways designed to accomplish the same functional result.

The embodiments of the invention in which an exclusive property or privilege is claimed are defined as follows:

1. Apparatus for automatically providing jet engine thrust rating data to aircraft avionic systems comprising:
   a data bus;
   a jet engine of an aircraft having a plurality of pins in a selected configuration to represent a thrust rating of the jet engine;
   an electronic engine controller coupled to said data bus and coupled to the pins of the jet engine for reading thrust rating data directly from the selected configuration of the pins and applying said thrust rating data to said data bus; and
   an avionic computer coupled to said data bus for receiving said thrust rating data applied to said data bus by said electronic engine controller, said avionic computer including a memory provided with a plurality of data entries whose values are a function of the thrust rating of the jet engine of said aircraft, said avionic computer determining if the thrust rating data is valid by determining if any of the plurality of data entries stored in the memory of said avionic computer correspond to the thrust rating data, said avionic computer using said thrust rating data received from said electronic engine controller to choose the data entries corresponding to the thrust rating data.

2. The apparatus of claim 1, wherein the memory of said avionic computer includes nonvolatile memory, and wherein said thrust rating data is stored in the nonvolatile memory only if the thrust rating data is valid.

3. The apparatus of claim 2, wherein the avionic computer:
   (a) periodically receives new thrust rating data from said electronic engine controller; and
   (b) compares the new thrust rating data with the thrust rating data stored in nonvolatile memory and stores the new thrust rating data in nonvolatile memory if the new thrust rating data differs from the stored thrust rating data.

4. The avionic system of claim 3, wherein the jet aircraft includes multiple jet engines and wherein the avionic computer compares the thrust rating data received from the jet engines and reports a fault condition if the thrust rating data does not match.

5. The avionic system of claim 4, wherein the avionic computer compares the thrust rating data received from the jet engines and reports said fault condition only when the jet aircraft is on the ground.

6. The apparatus of claim 2, wherein the avionic computer:
   (a) periodically receives new thrust rating data from said electronic engine controller; and
   (b) compares the new thrust rating data with the thrust rating data stored in nonvolatile memory and stores the new thrust rating data in nonvolatile memory if the new thrust rating data differs from the stored thrust rating data.

7. The avionic system of claim 6, wherein the jet aircraft includes multiple jet engines and wherein the avionic computer compares the thrust rating data received from the jet engines and reports a fault condition if the thrust rating data does not match.

8. The avionic system of claim 7, wherein the avionic computer compares the thrust rating data received from the jet engines and reports said fault condition only when the jet aircraft is on the ground.

9. The avionic system of claim 1, wherein the jet aircraft includes multiple jet engines and wherein the avionic computer compares the thrust rating data received from the jet engines and reports a fault condition if the thrust rating data does not match.

10. The avionic system of claim 9, wherein the avionic computer compares the thrust rating data received from the jet engines and reports said fault condition only when the jet aircraft is on the ground.

11. A method of automatically providing an engine thrust rating to an avionic computer of an aircraft, said method comprising:
    determining a configuration of a plurality of plugs provided in a jet engine to represent a thrust rating of the jet engine;
    transmitting a digital data representation of the thrust rating to the avionic computer;

causing the avionic computer to determine if a database includes entries corresponding to said thrust rating; and causing said avionic computer to store said thrust rating if said database includes entries corresponding to said thrust rating.

12. The method of claim 11, also comprising causing said avionic computer to update said stored thrust rating if a new thrust rating is received by said avionic computer.

13. The method of claim 12, also comprising causing said avionic computer to compare thrust rating data from different jet engines of the aircraft and produce a fault if the thrust rating data does not match.

14. Apparatus for automatically providing jet engine thrust rating data to aircraft avionic systems comprising:

a data bus;

an electronic engine controller coupled to the data bus and coupled to a jet engine of an aircraft for reading data supplied by the jet engine describing the thrust rating of the jet engine and applying the thrust rating data to the data bus;

an avionic computer coupled to the data bus for receiving the thrust rating data applied to the data bus by the electronic engine controller, the avionic computer including a memory provided with data related to the aircraft whose values are a function of the thrust rating of the jet engine of the aircraft, the avionic computer using the thrust rating data to choose the values of the data related to the aircraft; and wherein the memory of the avionic computer includes nonvolatile memory, and the thrust rating data is stored in the nonvolatile memory, and wherein the avionic computer periodically receives new thrust rating data from the electronic engine controller, and compares the new thrust rating data with the thrust rating data stored in nonvolatile memory and stores the new thrust rating data in nonvolatile memory if the new thrust rating data differs from the stored thrust rating data.

15. The avionic system of claim 14, wherein the jet aircraft includes multiple jet engines and wherein the avionic computer compares the thrust rating data received from the jet engines and reports a fault condition if the thrust rating data does not match.

16. The avionic system of claim 15, wherein the avionic computer compares the thrust rating data received from the jet engines and reports said fault condition only when the jet aircraft is on the ground.

17. Apparatus for automatically providing jet engine thrust rating data to aircraft avionic systems comprising:

an electronic engine controller coupled to a data bus and to each of a plurality of jet engines of an aircraft for reading data supplied by the jet engines describing the thrust rating of each of the jet engines and applying the thrust rating data to the data bus; and an avionic computer coupled to the data bus for receiving the thrust rating data, the avionic computer comparing the thrust rating data received from the jet engines and reporting a fault condition if the thrust rating data from each of the jet engines does not match, the avionic computer including a memory provided with data related to the aircraft whose values are a function of the thrust rating of the jet engines of the aircraft, the avionic computer using the thrust rating data to choose the values of the data related to the aircraft corresponding to the thrust rating data.

18. The avionic system of claim 17, wherein the avionic computer compares the thrust rating data received from the jet engines and reports said fault condition only when the jet aircraft is on the ground.

19. Apparatus for automatically providing jet engine thrust rating data to aircraft avionic systems comprising:

a data bus;

an electronic engine controller coupled to said data bus and coupled to a jet engine of an aircraft for reading thrust rating data supplied by the jet engine describing the thrust rating of the jet engine and applying said thrust rating data to said data bus;

an avionic computer coupled to said data bus for receiving said thrust rating data applied to said data bus by said electronic engine controller, said avionic computer including a memory provided with a plurality of data entries whose values are a function of the thrust rating of the jet engine of said aircraft, said avionic computer determining if the thrust rating data is valid by determining if any of the plurality of data entries stored in the memory of said avionic computer correspond to the thrust rating data, said avionic computer using said thrust rating data received from said electronic engine controller to choose the data entries corresponding to the thrust rating data, wherein the memory of said avionic computer includes nonvolatile memory, and wherein said thrust rating data is stored in the nonvolatile memory; and wherein the avionic computer periodically receives new thrust rating data from said electronic engine controller, and compares the new thrust rating data with the thrust rating data stored in nonvolatile memory and stores the new thrust rating data in nonvolatile memory if the new thrust rating data differs from the stored thrust rating data.

20. The avionic system of claim 19, wherein the jet aircraft includes multiple jet engines and wherein the avionic computer compares the thrust rating data received from the jet engines and reports a fault condition if the thrust rating data does not match.

21. The avionic system of claim 20, wherein the avionic computer compares the thrust rating data received from the jet engines and reports said fault condition only when the jet aircraft is on the ground.

22. A method of automatically providing an engine thrust rating defined by a plurality of plugs associated with a jet engine to an avionic computer of an aircraft, said method comprising:

determining, in accordance with a configuration of the plugs, the thrust rating of the jet engine;

transmitting a digital data representation of the thrust rating to the avionic computer;

causing the avionic computer to determine if a database includes entries corresponding to said thrust rating;

causing said avionic computer to store said thrust rating if said database includes entries corresponding to said thrust rating; and causing said avionic computer to update said stored thrust rating if a new thrust rating is received by said avionic computer.

23. The method of claim 22, also comprising causing said avionic computer to compare thrust rating data from different jet engines of the aircraft and to produce a fault if the thrust rating data does not match.

* * * * *